United States Patent
Haugwitz et al.

[15] 3,694,553
[45] Sept. 26, 1972

[54] METHOD OF CONTROLLING THE GROWTH OF BACTERIA AND FUNGI USING THE PHENYLHYDRAZINE SALT OF 2-MERCAPTOPYRIDINE-N-OXIDE

[72] Inventors: Rudiger D. Haugwitz, Highland Park, N.J.; John Uhoch, Jr., Seymour, Conn.

[73] Assignee: Olin Corporation

[22] Filed: Oct. 8, 1971

[21] Appl. No.: 187,904

Related U.S. Application Data

[62] Division of Ser. No. 5,914, Jan. 26, 1970, Pat. No. 3,634,438.

[52] U.S. Cl. .................................................. 424/263
[51] Int. Cl. ............................ A01n 9/00, A01n 9/22
[58] Field of Search ........................................ 424/263

[56] References Cited

UNITED STATES PATENTS

| | | | |
|---|---|---|---|
| 3,517,017 | 6/1970 | Haugwitz | 260/294.8 G |
| 3,517,018 | 6/1970 | Haugwitz | 260/294.8 G |

*Primary Examiner*—Albert T. Meyers
*Assistant Examiner*—Allen J. Robinson
*Attorney*—Gordon D. Byrkit et al.

[57] ABSTRACT

The phenylhydrazine salt of 2-mercaptopyridine-N-oxide is a novel composition of matter and is useful as a broad spectrum anti-bacterial and anti-fungal agent, especially against Gram-negative organisms.

1 Claim, No Drawings

METHOD OF CONTROLLING THE GROWTH OF BACTERIA AND FUNGI USING THE PHENYLHYDRAZINE SALT OF 2-MERCAPTOPYRIDINE-N-OXIDE

This is a division of co-pending application Ser. No. 5,914 filed Jan. 26, 1970, now U.S. Pat. No. 3,634,438, 1-11-72.

This invention relates to the novel phenylhydrazine salt of 2-mercaptopyridine-N-oxide and to the method of controlling the growth of micro-organisms using this salt.

The salt of this invention is prepared by reacting substantially equimolar proportions of the reactants suitably dissolved in an aprotic inert reaction medium at temperatures from room temperature to 140° C. On cooling, the product crystallizes and is filtered or otherwise separated from the reaction medium. It is useful as separated or it is suitably recrystallized when greater purity is desired.

Suitable inert reaction media include, for example, benzene, toluene, xylenes, petroleum ether, cyclohexane, chloroform, carbon tetrachloride and tetrachloroethylene.

The reaction time is not critical and may vary from a few minutes to 10 hours or more. Usually from 0.1 to 5 hours is satisfactory.

The compound is useful as a chemotherapeutic agent and is suitably formulated in any suitable compositions in suitable proportions, as decongestant, ear drops, foot powders or troches as described in U.S. Pat. No. 2,713,049 at column 3, lines 22–62 or U.S. Pat. No. 2,742,393 from column 2, line 35 to column 3, line 10.

EXAMPLE I

To a solution of 2.5 g. (0.0,197 mole) of 2-mercaptopyridine-N-oxide in 20 ml. of benzene was added a solution of 2.2 g. (0.022 mole) of phenylhydrazine in 5 ml. of benzene. The resulting precipitate was filtered off to yield 4.8 g. of initial product. Repeated crystallizations from ether furnished the analytically pure phenylhydrazine salt of 2-mercaptopyridine-N-oxide having a melting point of 72°–74° C. with decomposition.

Calc. for $C_{11}H_{13}N_3OS$: C, 56.15; H, 5.57; N, 17.86 percent

Found: C, 56.22, 56.36; H, 5.75, 5.84; N, 17.82, 17.53 percent

The broad spectrum of anti-bacterial and antifungal activity of the compound of this invention is shown in Table I and compared with several widely used commercial products. The advantage of the compound of this invention is clearly shown in Table I by its low minimum inhibitory concentration, especially against Gram-negative organisms.

TABLE I

| Organism No. | 1 | 2 | 3 | 4 | 5 | 6 |
|---|---|---|---|---|---|---|
| Gram | + | + | − | − | − | + |
| Product of Example I | 1.5 | 4.5 | 3.0 | 4.5 | 1.5 | 18.0 |
| t-Butyl Ammonium Salt (a) | <1.5 | 4.5 | >75 | 18.0 | − | − |
| Ammonium Salt (a) | <1.5 | 3.0 | 12.0 | 6.0 | − | − |
| Acid (a) | <1.5 | 3.0 | 12.0 | 12.0 | − | − |
| Sodium Salt (a) | <1.5 | 3.0 | 9.0 | 12.0 | 4.5 | 12.0 |
| Hydrazine Salt (a) | 3.0 | 18.0 | 25.0 | 6.0 | 25.0 | 18.0 |
| Commercial Products | | | | | | |
| N-(3-Chloroallyl) hexaminium chloride | 18.7 | 37.5 | 75.0 | 37.5 | 50.0 | − |
| 3,4,5-Tribromosalicyl anilide | 0.35 | 0.92 | 100 | 12.5 | 37.5 | − |
| A mixture of 3,4',5-tribromosalicylanilide and 12–20 percent 3,5 dibromosalicylanilide | 0.78 | 4.6 | 75.0 | 18.7 | 50.0 | − |
| Sodium orthophenylphenate | 100 | 100 | 100 | 100 | 100 | − |
| Pentachlorophenol, sodium salt | 0.87 | 3.0 | 75 | | 75 | 100 | − |

(a) Of 2-mercaptopyridine-N-oxide Organisms:
(1) Staphylococcus aureus 209 P
(2) Streptococcus faecalis SC 164
(3) Pseudomonas aeruginosa SC 3840
(4) Proteus vulgaris SC 3855
(5) Aerobacter aerogenes SC 1678
(6) Lactobacillus casei

What is claimed is:

1. A method of controlling the growth of bacteria and fungi by applying to said micro-organisms an effective anti-bacterial and anti-fungal amount of the phenylhydrazine salt of 2-mercaptopyridine-N-oxide.

* * * * *